United States Patent
Noji (10) Patent No.: US 6,949,999 B2
(45) Date of Patent: Sep. 27, 2005

(54) APPARATUS FOR HOLDING A STABLE CONDITION AT TWO POSITIONS AND A LENS APPARATUS

(75) Inventor: Takayoshi Noji, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 0 days.

(21) Appl. No.: 10/679,417

(22) Filed: Oct. 7, 2003

(65) Prior Publication Data

US 2004/0263299 A1 Dec. 30, 2004

(30) Foreign Application Priority Data

Jun. 11, 2003 (JP) .................................. 2003-166393

(51) Int. Cl.⁷ ............................................... H01F 7/08
(52) U.S. Cl. ..................................... 335/220; 359/544
(58) Field of Search .............................. 359/554–557, 359/249; 335/220–234; 396/55, 89; 369/244, 44.16, 55, 89, 554–557, 249

(56) References Cited

U.S. PATENT DOCUMENTS 6,157,779 A * 12/2000 Kosaka et al. ................ 396/55

FOREIGN PATENT DOCUMENTS

JP 2002021923 A 1/2002 .......... F16F/15/03

\* cited by examiner

*Primary Examiner*—Lincoln Donovan
(74) *Attorney, Agent, or Firm*—Jacobson Holman PLLC (57) ABSTRACT

An apparatus for holding a stable condition at two positions comprising a driving magnet 130 having driving magnetic poles and adapted to be movable in two directions; a driven magnet 140 having driven magnetic poles arranged to be always repulsed by the driving magnetic poles and adapted to be movable in two directions; a motion limiting means for limiting the movement of the driven magnet; and a driving means for driving the driving magnet in two directions. A direction of the repulsion force applied to the driven magnet by the driving magnet is changed, at a stage during which the driving magnet is moved to a first moving direction by the driving means, to a second acting direction of repulsion force opposite to a first acting direction of repulsion force which has been caused until said stage; and at a stage during which the driving magnet is moved to the second moving direction opposite to the first moving direction by the driving means, to the first acting direction of repulsion force opposite to the second acting direction of repulsion force which has been caused until said stage.

8 Claims, 11 Drawing Sheets

PRIOR ART

FIG.11

PRIOR ART

FIG.12 PRIOR ART

APPARATUS FOR HOLDING A STABLE CONDITION AT TWO POSITIONS AND A LENS APPARATUS

FIELD OF THE INVENTION

The present invention relates to an apparatus for holding a stable condition at two positions adapted to be able to be stopped at two positions. More particularly, the present invention relates to an apparatus for holding a stable condition at two positions effectively using a force of an actuator and a repulsion force of magnets. In addition, the present invention relates to a lens apparatus using the apparatus for holding a stable condition at two positions effectively using a force of an actuator and a repulsion force of magnets.

BACKGROUND OF THE INVENTION (1) Magnet Damping Mechanism

Figure 10:
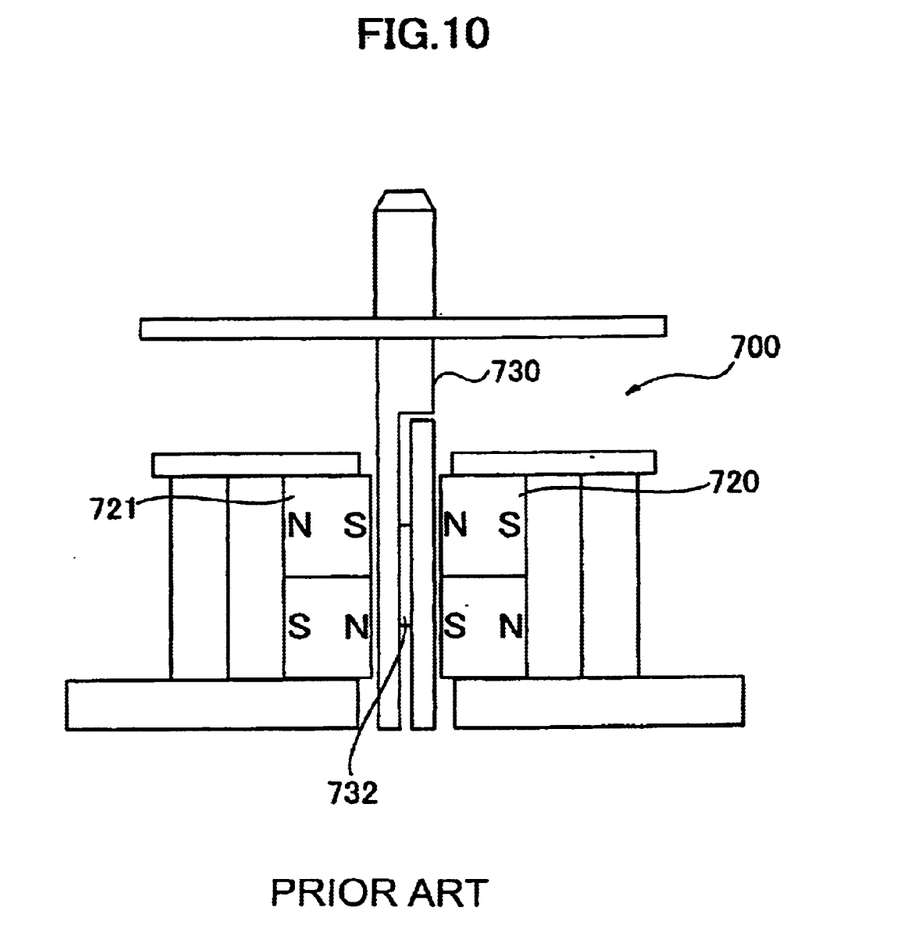
FIG. 10 is a cross-sectional view of a magnet damping mechanism of the prior art.

With reference to FIG. 10, a magnet damping mechanism 700 of the prior art has a conductive working member 730 movably arranged between a pair of magnets 720 and 721 of which magnetic poles are so arranged that an attractive force is caused therebetween. A damping force is caused in the working member 730 by electromagnetic induction due to axial movement of the working member 730. In addition, an attractive force is caused between the magnets 720 and 721 and a ferromagnetic member 732 arranged within the working member 730. Thus, the magnet damping mechanism 700 exhibits a self-aligning function to stably hold the working member 730 at a predetermined position (see e.g Document 1: Japanese Laid-open Patent Publication No. 21923/2002).

(2) a Mechanism for Holding a Stable Condition at Two Positions Using Magnets

Figure 11:
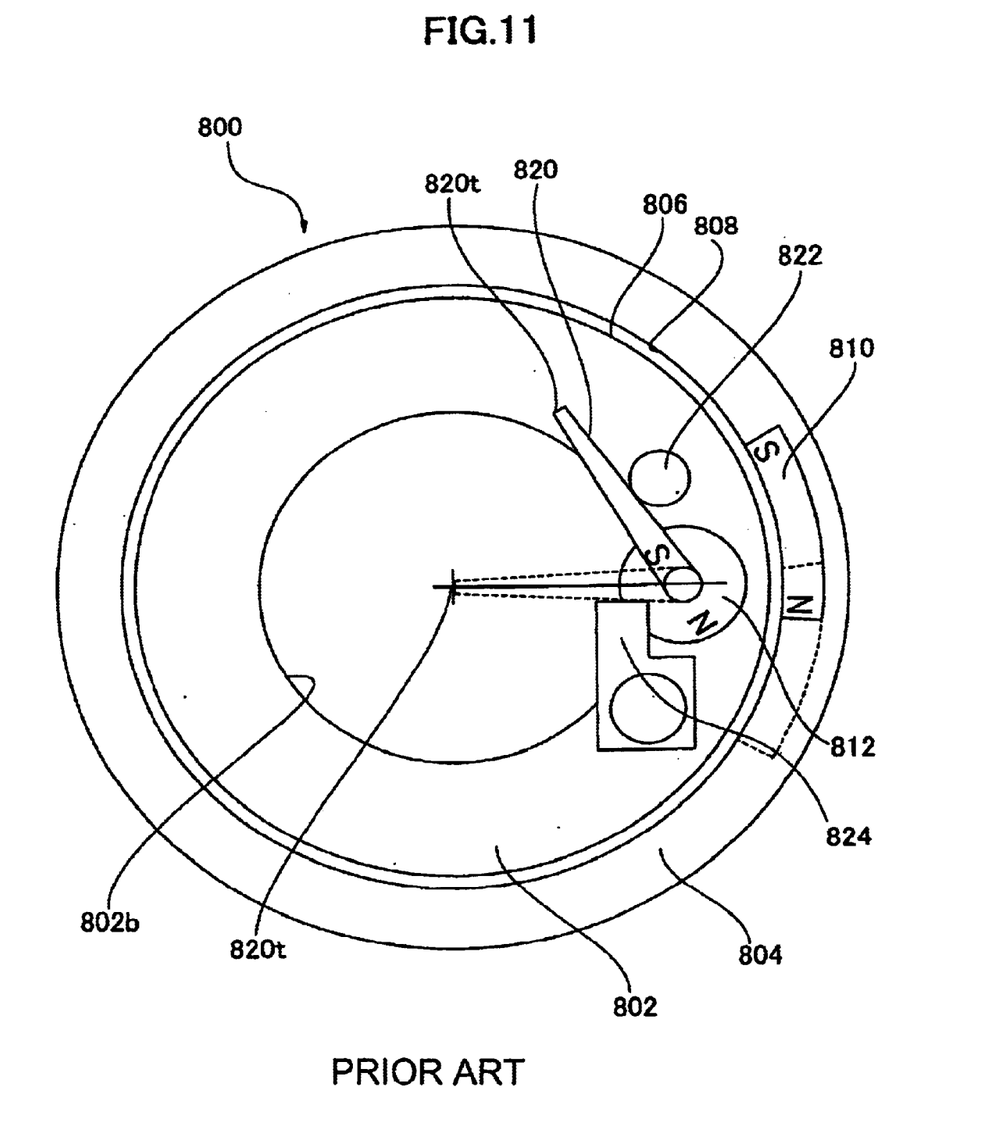
FIG. 11 is a front elevation view of an apparatus for holding a stable condition at two positions using magnets of the prior art.

With reference to FIG. 11, a mechanism 800 for holding a stable condition at two positions using magnets of the prior art comprises a camera cone 802 and a roll ring 804. A camera cone thread 806 is formed on the outer circumferential surface of the camera cone 802 and a roll ring thread 808 is formed on the inner circumferential surface of the roll ring 804. The roll ring thread 808 is screwed on the camera cone thread 806 and is snugly engaged therewith. The camera cone thread 806 and the roll ring thread 808 may be ordinary threads, grease threads or the combination thereof. A main magnet 810 is arranged on the roll ring 804 along its inner circumferential surface. A follower magnet 812 is rotatably arranged at a position inside the inner circumferential surface of the roll ring 804. An indicating member 820 is secured on the follower magnet 812. A first stopper 822 is secured on the camera cone 802 for limiting the rotation of the indicating member 820 in its clockwise direction. A second stopper 824 is also secured on the camera cone 802 for limiting the rotation of the indicating member 820 in its anticlockwise direction. A tip 820t of the indicating member 820 is positioned at the center of the camera cone 802 in a condition when the indicating member 820 contacts the second stopper 824 (shown by a dotted line in FIG. 11). The tip 820t of the indicating member 820 is positioned at a position out of a window 802b of the camera cone 802 in a condition when the indicating member 820 contacts the first stopper 822.

In a condition in which the indicating member 820 contacts the first stopper, the N pole of the main magnet 810 repulses the N pole of the follower magnet 812 and thus rotates the follower magnet 812 in a clockwise direction. Under the condition in which the indicating member 820 contacts the first stopper, if the roll ring 804 is rotated in a clockwise direction, the S pole of the main magnet 810 attracts the N pole of the follower magnet 812 and thus rotates the indicating member 820 in an anticlockwise direction. If the roll ring 804 is further rotated in a clockwise direction until the S pole of the main magnet 810 is positioned nearest to the N pole of the follower magnet 812, the indicating member 820 will occupy the position in which it contacts the second stopper 824 (shown by the dotted line in FIG. 11).

Figure 12:
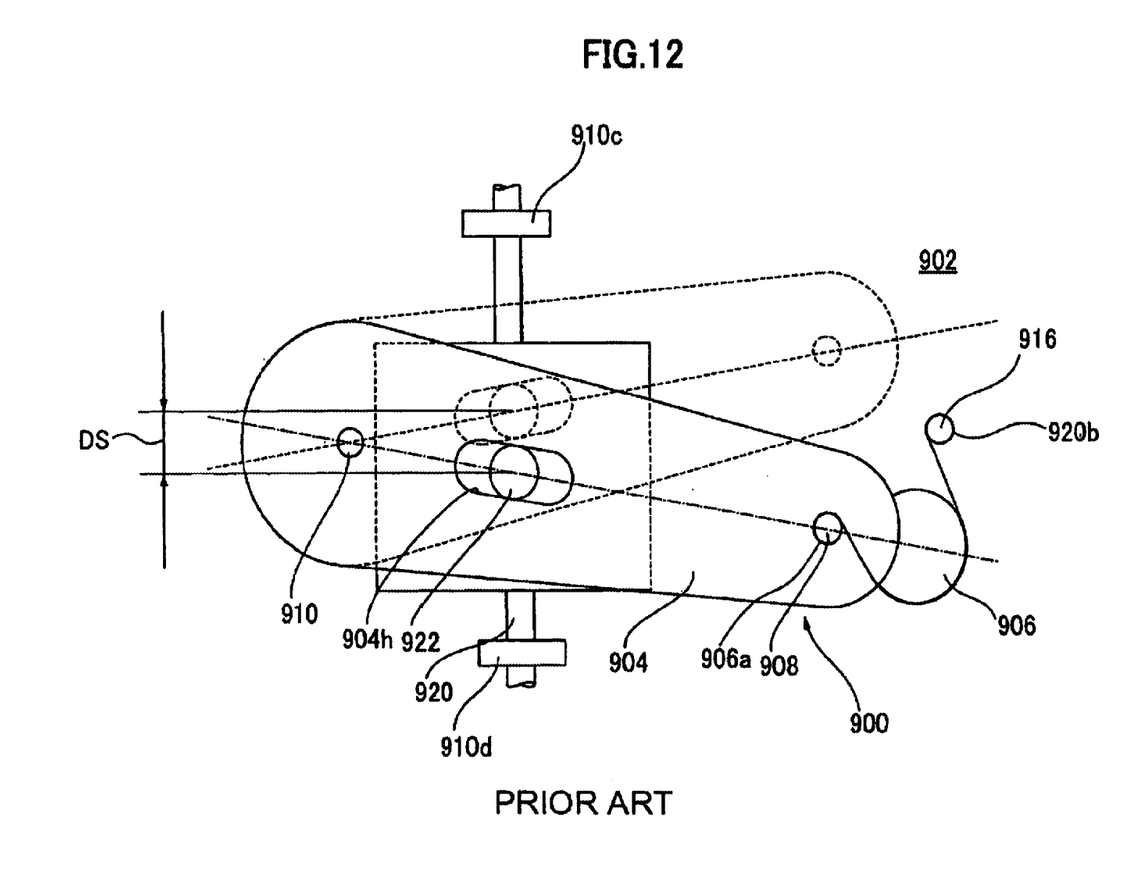
FIG. 12 is a front elevation view of an apparatus for holding a stable condition at two positions of manual operation type of the prior art.

(3) a Mechanism for Holding a Stable Condition at Two Positions Using a Reversible Self-Holding Elastic Member With reference to FIG. 12, the mechanism 900 for holding a stable condition at two positions using a reversible self-holding elastic member of the prior art has a working lever 904 pivotably mounted on a working lever pin 910 secured on a base member 902. A positioning pin 908 is mounted on the working lever 904 for securing one end 906a of a reversible self-holding elastic member 906. The end 906a of the reversible self-holding elastic member 906 is secured on the positioning pin 908 by winding it around the pin 908. The other end 906b of the reversible self-holding elastic member 906 is secured on a mount pin 916 secured on the base member 902 by winding it around the mount pin 916. A working member 920 is assembled to two guiding portion 910c and 910d on the base member 902 so that it can slide therein. A driving pin 922 mounted on the working member 920 is arranged within an elongated hole 904h formed in the driving pin 922.

Initially the working lever 904 is positioned at a position shown by a solid line in FIG. 12 by the elastic force of the reversible self-holding elastic member 906. Then the working lever 904 is positioned at a position shown by a dotted line in FIG. 12 by manually rotating the working lever 904 in an anticlockwise direction. If then manually rotating the working lever 904 in a clockwise direction, the working lever 904 will be returned to and positioned again at the position shown by a solid line in FIG. 12. During the rotation of the working lever 904, the working member 902 can be slid within the guiding portions 910c and 910d due to the movement of the elongated hole 904h and thus the driving pin 922. The slidable stroke of the working member 920 is shown as "DS" in FIG. 12. The working lever 904 may be driven by a suitable means such as a solenoid.

Said Document 1 is Japanese Laid-open Patent Publication No. 21923/2002 (Pages 3~5, FIGS. 1~3).

(4) Problem of the Magnet Damping Mechanism

This mechanism can achieve the self-aligning function with the generation of the damping force. However, it is impossible to stop the working member at two predetermined positions.

(5) Problem of the Mechanism for Holding a Stable Condition at Two Positions Using Magnets This mechanism requires, in order to rotate the follower magnet, to rotate the main magnet until the rotational driving force is generated in the follower magnet. According to this mechanism, the indicating member is rotated in an anticlockwise direction by rotating the roll ring in a clockwise direction so that the S pole of the main magnet attracts the N pole of the follower magnet. Accordingly, since the gradient of the change in actuating force from the main magnet relative to the rotational angle of the follower magnet becomes gentle, it is impossible to reduce the hysteresis of the actuating force applied to the follower magnet by the main magnet.

(6) Problem of the Mechanism for Holding a Stable Condition at Two Positions Using a Reversible Self-Holding Elastic Member According to this mechanism of the prior art, it is difficult to stabilize the operation of the reversible self-holding elastic member because of the reduction of the elastic force of the reversible self-holding elastic member when the stroke for moving the working lever to the reversed position is reduced. Accordingly, it is required to sufficiently increase the distance between the center of rotation of the working lever and the positioning pin. However, in order to set the movable stroke of the working member at about 0.1 mm, it is afraid that that the distance between the center of rotation of the working lever and the positioning pin would become large beyond the practical length adaptable to ordinary cameras or cellular-phones.

SUMMARY OF THE INVENTION

It is, therefore, an object of the present invention to provide a small apparatus for holding a stable condition at two positions which has a self-holding function and can achieve the positive reversible movement between two positions. It is another object of the present invention to provide an apparatus for holding a stable condition at two positions which can set the movable stroke of the working member at about 0.1 mm~0.5 mm. It is another object of the present invention to provide an apparatus for holding a stable condition at two positions which has a simple structure and can achieve positive positioning at two positions. It is other object of the present invention to provide a lens apparatus using an apparatus for holding a stable condition at two positions which has a self-holding function and a very small hysteresis in its operation. It is a further object of the present invention to provide a lens apparatus using an apparatus for holding a stable condition at two positions which can set the movable stroke of the working member at about 0.1 mm~0.5 mm. It is a further object of the present invention to provide a lens apparatus using an apparatus for holding a stable condition at two positions which has a simple structure and can achieve positive positioning at two positions.

According to the present invention, there is provided an apparatus for holding a stable condition at two positions comprising a driving magnet having driving magnetic poles and adapted to be movable in two directions; a driven magnet having driven magnetic poles arranged to be always repulsed by the driving magnetic poles and adapted to be movable in two directions; a motion limiting means for limiting the movement of the driven magnet; and a driving means for driving the driving magnet in two directions. In the apparatus for holding a stable condition at two positions of the present invention, it is so constructed that a direction of the repulsion force applied to the driven magnet by the driving magnet is changed, at a stage during which the driving magnet is moved to a first moving direction by the driving means, to a second acting direction of repulsion force opposite to a first acting direction of repulsion force which has been caused until said stage. Further in the apparatus for holding a stable condition at two positions of the present invention, it is so constructed that a direction of the repulsion force applied to the driven magnet by the driving magnet is changed, at a stage during which the driving magnet is moved to the second moving direction opposite to the first moving direction by the driving means, to the first acting direction of repulsion force opposite to the second acting direction of repulsion force which has been caused until said stage. It is preferable that the driving means may be made of shape-memory alloy and may include a driving element for driving the driving magnet. This structure enables to realize a small apparatus for holding a stable condition at two positions which has a simple structure and can achieve positive positioning at two positions.

It is also preferable that an amount of movement of the driving magnet may be larger than that of the driven magnet. This structure enables to realize a small apparatus for holding a stable condition at two positions which can set the movable stroke of the working member driven by the follower magnet at about 0.1 mm~0.5 mm. It is possible that the driving magnet and the driven magnet may be moved in parallel with each other and that at least one of the driving magnet and the driven magnet may be moved in rotation. It is preferable that the driving means may comprise a first driving element made of shape-memory alloy for driving the driving magnet toward the first moving direction, and a second driving element made of shape-memory alloy for driving the driving magnet toward the second moving direction.

It is also preferable that the driving means may comprise a driving element made of shape-memory alloy, the driving element may include a first driving element portion for driving the driving magnet toward the first moving direction and a second driving element portion for driving the driving magnet toward the second moving direction, the driving means may further comprise a first wiring for supplying a current to the first driving element portion, a second wiring for supplying a current to the second driving element portion, and a power supplying portion for selectively supplying the current to the first wiring or the second wiring. This structure enables to realize a simple apparatus for holding a stable condition at two positions without using any means such as a connecting mechanism, an elastic member or a cam.

Further according to the present invention, there is provided lens apparatus having a lens system including a moving lens comprises a lens supporting member, and an apparatus for holding a stable condition at two positions mentioned above. This lens apparatus is characterized in that the moving lens can be driven by the movement of a driven magnet of the apparatus for holding a stable condition at two positions. This structure enables to realize a small lens apparatus having a simple structure and moving lens of positive operation.

As described above, the apparatus for holding a stable condition at two positions comprises a driving magnet, a driven magnet arranged to be always repulsed by the driving magnetic poles and adapted to be movable in two directions, a driving means (i.e. an actuator) for driving the driving magnet in two directions, and the driving means (actuator) is a driving element made of shape-memory alloy. Thus the apparatus for holding a stable condition at two positions of the present invention has following superior effects: Since the apparatus of the present invention does not require any means such as a connecting mechanism, an elastic member or a cam, it is possible to drive the apparatus from the outside of the housing such as a camera cone and thus to make the structure of the apparatus simple; Since the apparatus of the present invention comprises the driving magnet and the follower magnet, the actuating force acting on the follower magnet during the way of its going to the stable position becomes maximum at a point beyond the neutral point. Accordingly, the hysteresis of magnet during operation is very small and thus it is possible to positively position the follower magnet at two positions; According to the apparatus of the present invention, it is possible to make the movable stroke of the working member driven by the follower magnet a small amount as 0.1 mm~0.5 mm and thus to make the apparatus small; According to the lens apparatus of the present invention using the apparatus for holding a stable condition at two positions of the present invention, it has the self-holding function, the hysteresis of magnet during the operation of the apparatus for holding a stable condition at two positions is very small, and the movable stroke of the working member small as 0.1 mm~0.5 mm; and Since the apparatus for holding a stable condition at two positions is simple in structure, the lens apparatus using it can be also compacted.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE INVENTION AND THE PREFERRED EMBODIMENTS

The preferred embodiments of the present invention will be hereinafter described with reference to the accompanied drawings. Firstly, the present invention will be described with reference to an embodiment of a lens apparatus using an apparatus for holding a stable condition at two positions of the present invention as a macro switching mechanism. The apparatus for holding a stable condition at two positions of the present invention can be used to many applications including not only the macro switching mechanism but a stop switching mechanism, a filter switching mechanism, a focal distance switching mechanism, a shutter operating mechanism, etc.

(1) Structure of the Lens Apparatus

Figure 1:
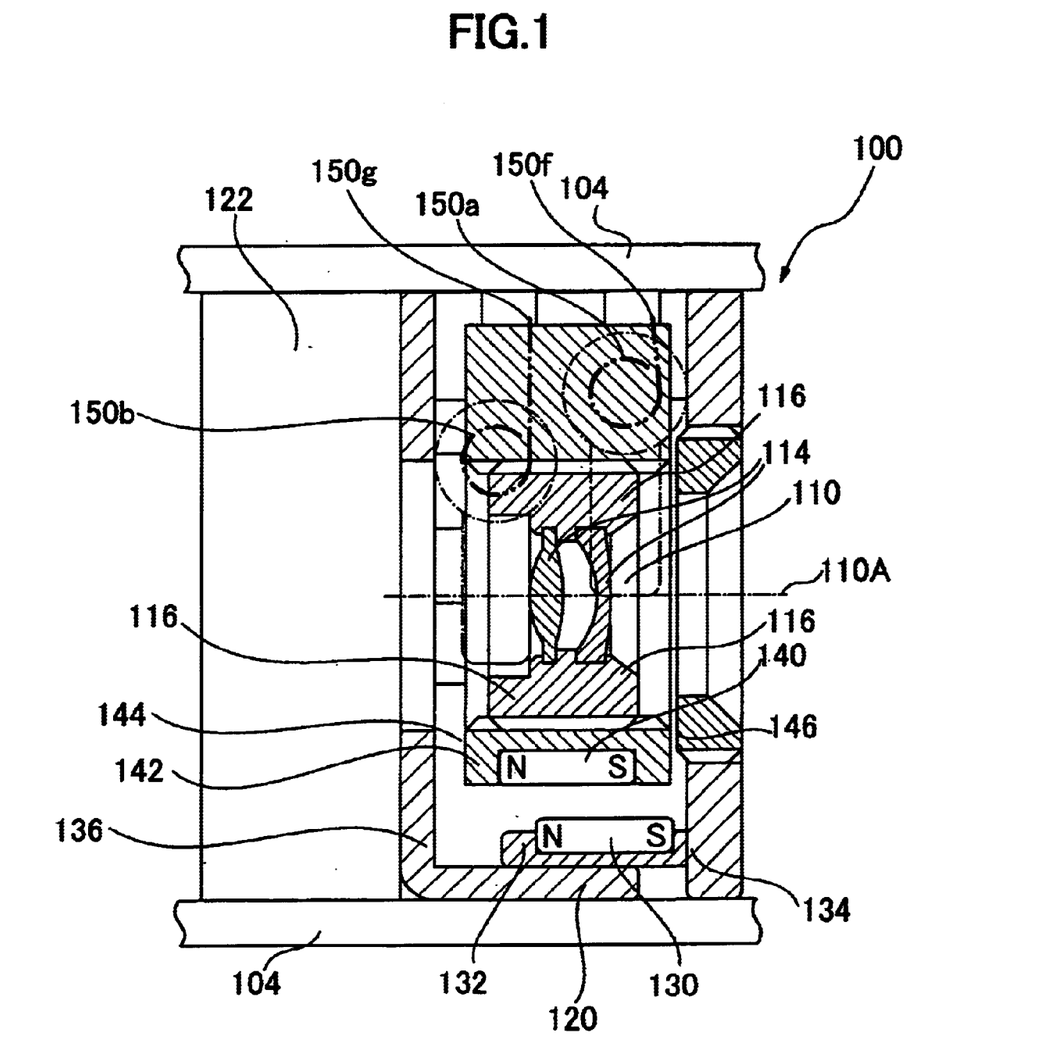
FIG. 1 is a vertical cross-sectional view of left-hand side of the lens structure of an embodiment of a lens apparatus using the apparatus for holding a stable condition at two positions of the present invention.
Figure 2:
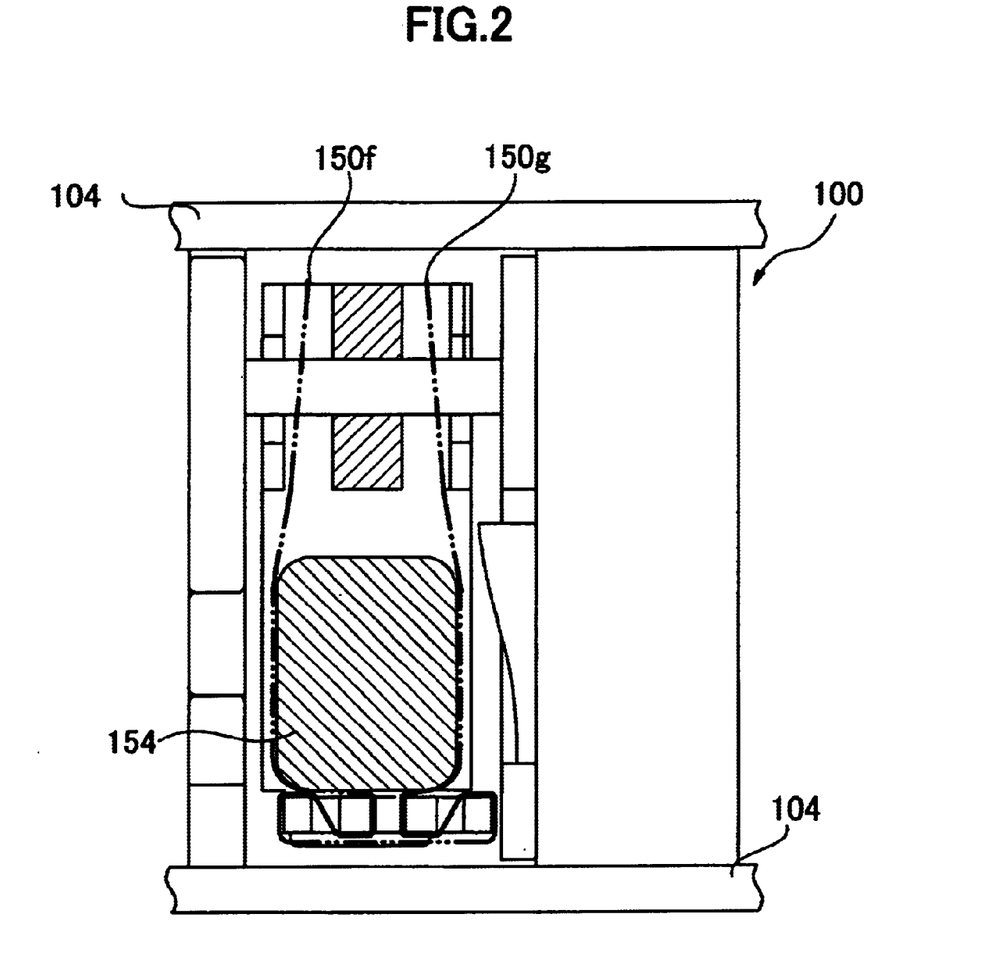
FIG. 2 is a vertical cross-sectional view of right-hand side of the lens structure of an embodiment of a lens apparatus using the apparatus for holding a stable condition at two positions of the present invention.
Figure 3:
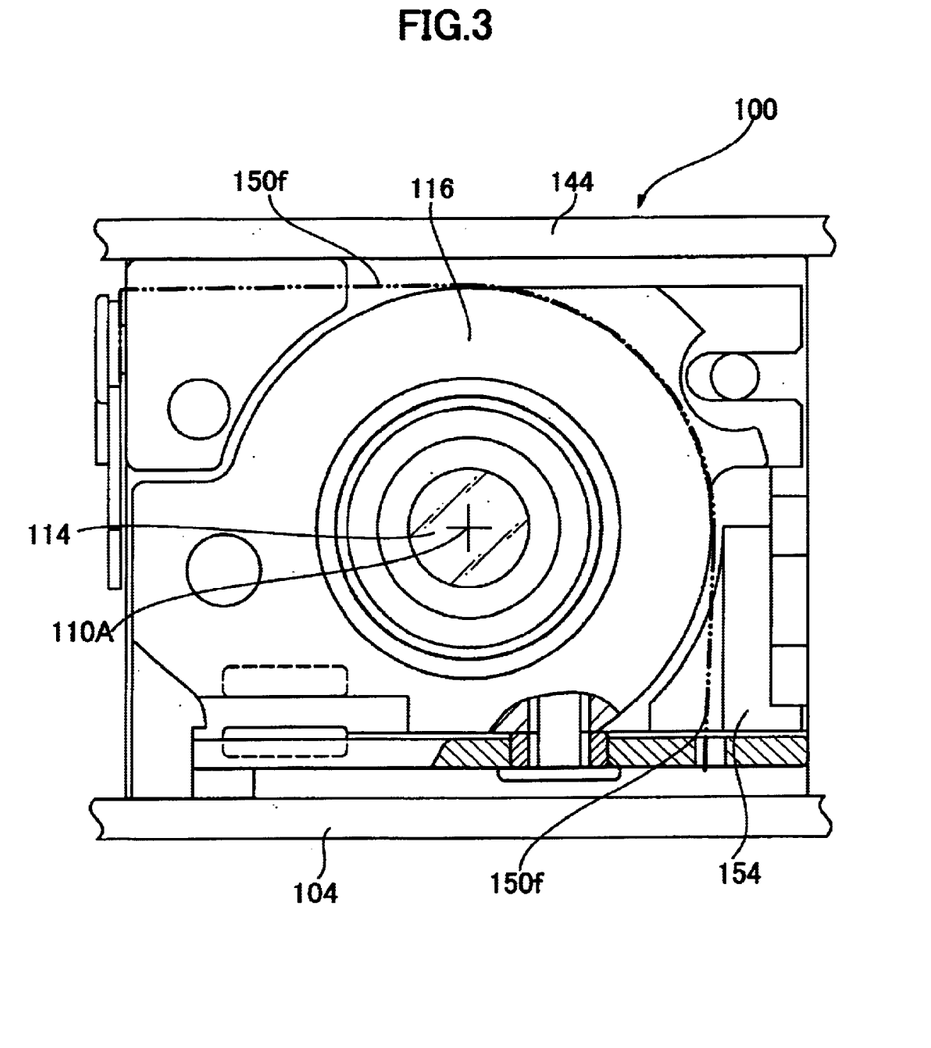
FIG. 3 is a front elevation view of the lens structure of an embodiment of a lens apparatus using the apparatus for holding a stable condition at two positions of the present invention.

The first embodiment of the lens apparatus of the present invention is a structure of a photographing lens used in cameras such as a still camera, a digital camera, a video camera, a TV camera, etc. The lens apparatus of the present invention can be widely used to many optical instruments such as not only cameras but a binocular, a telescope, a microscope, an over head projector, a liquid crystal projector, a projector, a light projector, a distance measuring instrument, etc. With reference to FIGS. 1~5, a lens apparatus 100 using the apparatus for holding a stable condition at two positions of the present invention comprises supporting members 104, and a lens system 110. The lens system 110 comprises a movable lens 114 including two lenses. The lens system 110 has an optical axis 110A. The movable lens 114 is supported on a movable camera cone 116 movable relative to a main camera cone 120. The main camera cone 120 forms a lens supporting member for supporting the lens system 110. The movable lens 114 is movable along the optical axis 110A. Although the lens system 110 is shown in FIG. 1 as including only the movable lens in the illustrated embodiment, it is possible to form the lens system 110 of the lens apparatus 100 as having both the fixed lens and the movable lens. The movable camera cone 116 may be made of insulating material such as plastic.

In the first embodiment of the lens apparatus of the present invention shown in FIGS. 1~5, the movable lens 114 can move between a normal position and a macro position. If the lens apparatus is a variable focal lens, the movable lens can be structured so that they move between two positions in order to vary the focal distance of the lens system. An imaging element 122 is supported on the supporting members 104 for receiving an image of an object focused by the lens system 110. The imaging element 122 may be formed for example by a CCD (Charge Coupled Device) sensor or a CMOS (Complementary Metal Oxide Semiconductor) sensor. A film may be also used in place of the imaging element 122. A driving magnet 130 having driving magnetic poles (N pole and S pole) is secured on a driving magnet holder 132. The holder 132 is mounted on the supporting members 104 so that it can rotate in two directions (clockwise and anti-clockwise directions) around a rotational center 132c (FIG. 5) of the driving magnet 130 and thus the driving magnet 130 can be also rotated in two directions (clockwise and anti-clockwise directions).

Figure 5:
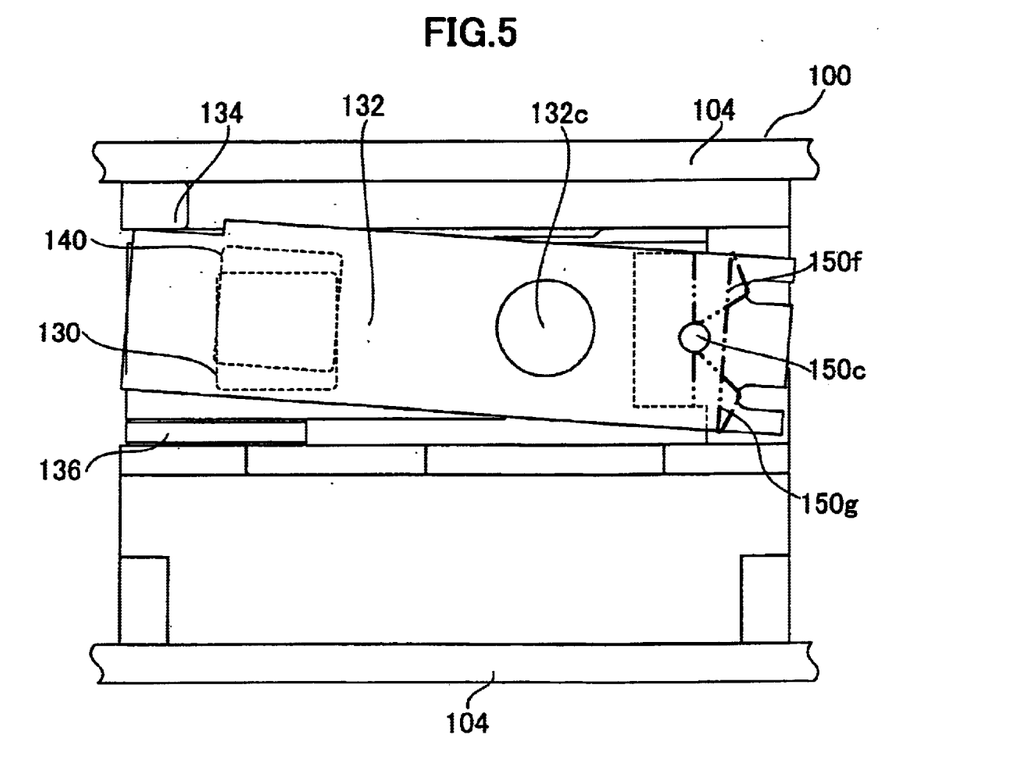
FIG. 5 is a bottom-plan view of the lens structure of an embodiment of a lens apparatus using the apparatus for holding a stable condition at two positions of the present invention.

As shown in FIG. 5, a normal position limiting portion 134 is mounted on the supporting member 104 for limiting the rotational motion of the driving magnet holder 132 and thus the driving magnet 130 when the holder 132 is rotated in the clockwise direction. Similarly, a macro position limiting portion 136 is also mounted on the supporting member 104 for limiting the rotational motion of the driving magnet holder 132 and thus the driving magnet 130 when the holder 132 is rotated in the anti-clockwise direction. Alternatively, it is possible to arrange the driving magnet holder 132 so that the holder 132 and thus the driving magnet 130 can move linearly along the supporting member 104. In such a structure, the holder 132 can be slidably mounted on the supporting member 104.

A follower magnet 140 having two follower magnetic poles (N pole and S pole) is secured on a follower magnet holder 142. A gap is formed between the driving magnet 130 and the follower magnet 140. One magnetic pole (e.g. N pole) of the follower magnet 140 is arranged so that it is repulsed by one magnetic pole (i.e. N pole) of the driving magnet 130. Similarly, the other magnetic pole (e.g. S pole) of the follower magnet 140 is arranged so that it is repulsed by one magnetic pole (i.e. S pole) of the driving magnet 130. The follower magnet holder 142 is mounted on the supporting member 104 so that it can move linearly along the supporting member 104 in two directions (left and right directions in FIG. 1). The movable camera cone 116 is secured on the follower magnet holder 142.

As shown in FIG. 1, a normal position limiting portion 144 is mounted on the supporting member 104 for limiting the linear motion of the follower magnet holder 142 and thus the follower magnet 140 when the holder 142 is moved linearly toward the left direction. Similarly, a macro position limiting portion 146 is mounted on the supporting member 104 for limiting the linear motion of the follower magnet holder 142 and thus the follower magnet 140 when the holder 142 is moved linearly toward the right direction. The normal position limiting portion 144 and the macro position limiting portion 146 form motion limiting means for limiting the motion of the follower magnet. In this embodiment, at least one of the driving magnet 130 or the follower magnet 140 (the driving magnet 130 in the illustrated embodiment) is rotatably mounted. Alternatively, the follower magnet holder 142 can rotate relative to the support members 104 and also not only the driving magnet 130 but the follower magnet 140 can rotate relative to the support member 104. In such a modification, the follower magnet holder 142 is structured so that it can rotate around a rotational center arranged on the supporting member 104. In another alternative modification, the driving magnet holder 132 as well as the follower magnet holder 142 can linearly move relative to the support members 104 so as to enable the driving magnet as well as the follower magnet to be moved in parallel with each other.

It is preferable that an amount of movement of the driving magnet 130 is larger than that of the follower magnet 140. The amount of movement of the driving magnet 130 can be freely set by changing the distance between the normal position limiting portion 134 and macro position limiting portion 136. The amount of movement of the follower magnet 140 can be freely set by changing the distance between the normal position limiting portion 144 and macro position limiting portion 146. This structure enables the follower magnet 140 to be positively moved within a predetermined amount of movement (e.g. 0.1 mm~0.5 mm) by moving the driving magnet 130.

An actuator, that is, driving means for rotating the driving magnet 130 in two directions is arranged within the supporting members 104. The actuator comprises a driving element for moving the driving magnet 130. It is preferable to arrange the driving element within the supporting members 104 in order to prevent the driving element from being influenced by ambient condition such as wind. The driving element is made of an alloy wire 150 of shape-memory alloy. The shape-memory alloy forming the alloy wire 150 may be for example of Ni—Ti family shape-memory alloy. Other shape-memory alloy for example of Ni—Ti—Fe, Ni—Ti—Cu, Ni—Ti—Nb or Ni—Ti—Cr family may be used as material forming the alloy wire 150. The shape-memory alloy of Ni—Ti family is available for example from Furukawa Electric Industries, Japan under a trade name of "Ni—Ti family shape-memory/superelasticity alloy".

Figure 4:
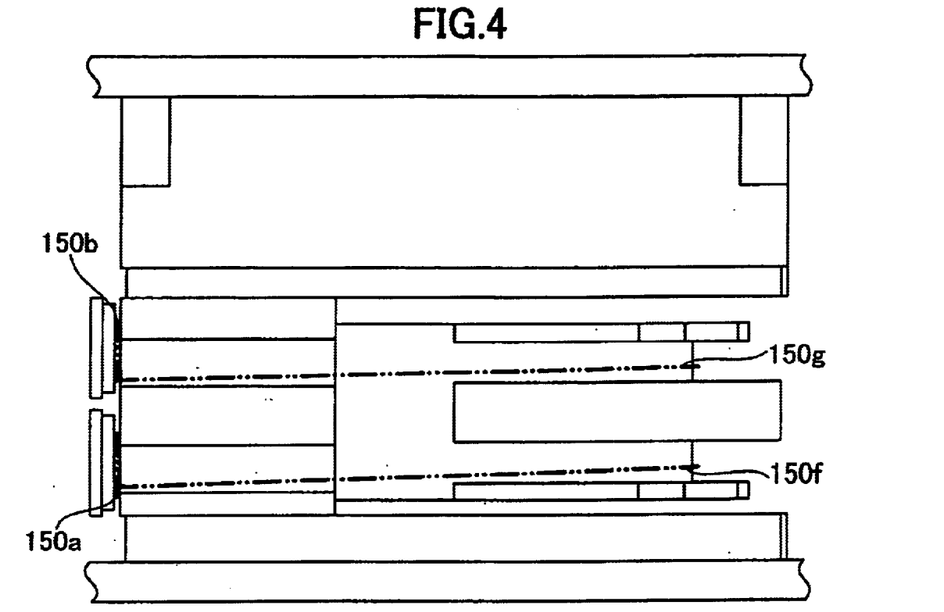
FIG. 4 is a top-plan view of the lens structure of an embodiment of a lens apparatus using the apparatus for holding a stable condition at two positions of the present invention.

One end 150a of the alloy wire 150 is secured to a first position on the supporting member 104 (see FIGS. 1 and 4). The other end 150b of the alloy wire 150 is secured to a second position on the supporting member 104 (see FIGS. 1 and 4). The alloy wire 150 is arranged along a portion of the outer circumferential surface of the movable camera cone 116 and then is guided to the outer circumferential surface of the alloy wire guiding portion 154. The alloy wire guiding portion 154 can be formed by insulating material such as plastic. It is possible to increase the whole length of the alloy wire 150 by arranging the alloy wire 150 around the outer circumferential surface of the movable camera cone 116 and thus to increase the absolute value of contraction of the alloy wire 150 when it is heated. It is preferable to provide a groove around the movable camera cone 116 for guiding the alloy wire 150. The provision of such a groove enables to prevent the position of the alloy wire 150 from being shifted when the alloy wire 150 is contracted.

A middle portion 150c (FIG. 5) in length of the alloy wire 150 is secured at a position near the end of the driving magnet holder 132. U-shaped grooves for engaging the alloy wire 150 are formed at two positions near the end of the driving magnet holder 132. The alloy wire 150 is arranged to be passed through the U-shaped grooves. The driving magnet holder 132 and the alloy wire 150 can be mechanically and electrically combined with each other by applying conductive adhesive on the U-shaped grooves. A portion between the end 150a of the alloy wire 150 and the middle portion 150c in length of the alloy wire 150 forms a first driving element portion 150f for moving the driving magnet 130 to the first direction. A portion between the other end 150b of the alloy wire 150 and the middle portion 150c in length of the alloy wire 150 forms a second driving element portion 150g for moving the driving magnet 130 to the second direction opposite to the first direction. The direction in which the first driving element portion 150f applies a force to the driving magnet holder 132 is set at substantially perpendicular to the center line of the driving magnet holder 132. Similarly, the direction in which the second driving element portion 150g applies a force to the driving magnet holder 132 is set at substantially perpendicular to the center line of the driving magnet holder 132.

A first wiring (not shown) for supplying current to the first driving element portion 150f is connected to the end 150a of the alloy wire 150 and the middle portion 150c in length of the alloy wire 150. A second wiring (not shown) for supplying current to the second driving element portion 150g is connected to the other end 150b of the alloy wire 150 and the middle portion 150c in length of the alloy wire 150. There is also provided a power supply portion (not shown) including a battery, condenser, etc. for selectively supplying current to the first or second wiring. A first switch portion (not shown) for controlling current supply from the power supply portion to the first wiring is provided on the first wiring. Similarly, a second switch portion (not shown) for controlling current supply from the power supply portion to the second wiring is provided on the second wiring. The first and second switch portions may be formed by slide switches, rotary switches, button switches, touch switches, etc. or may be electronic circuits including switching circuits.

The power supply portion, and the first and second switch portions may be assembled to the lens apparatus 100, may be assembled to a body (e.g. a still camera, a video camera, a guard camera, etc.) of the photographing apparatus to which the lens apparatus 100 is to be mounted, or may be assembled to a power supply switch control unit arranged separately from the lens apparatus.

Although the first driving element portion 150f and the second driving element portion 150g are formed by a single alloy wire 150 in the illustrated embodiment, they may be formed by separate alloy wires, as for example, a first alloy wire forms the first driving element portion 150f and a second alloy wire forms the second element portion 150g. In addition, although it is described in the illustrated embodiment that the length of the first driving element portion 150f is same as that of the second driving element portion 150g, it is possible to make the length of the first driving element portion 150f different from that of the second driving element portion 150g. In such a case, it is possible to adapt characteristics such as materials, outer diameters, lengths etc. of the first and second driving element portions 150f and 150g to a necessary amount of movement of the driving magnet 130 on the basis of previously carried out theoretical calculation or experimental analysis.

(2) Operation of the Lens Apparatus

The operation of the lens apparatus of the invention will be hereinafter described. With reference to FIGS. 1~5, in a condition in which the first wiring switch portion is "ON" and the second wiring switch portion is "OFF", the current is fed from the power supply to the first wiring and thus the first driving element portion 150f is heated. When the first driving element portion 150f is heated, its length is shortened and thus the driving magnet 130 is moved toward the first direction. The length of the second driving element portion 150g is determined so that the second driving element portion 150g is not tightened when the length of the first driving element portion 150f is shortened under the circumstances. Then if the first wiring switch portion is turned "OFF", the feeding of current from the power supply portion to the first wiring is shut off and thus the temperature of the first driving element portion 150f is returned to the ordinary temperature. When the temperature of the first driving element portion 150f is returned to the ordinary temperature, the length of the first driving element portion 150f is returned to its original length.

On the contrary, in a condition in which the second wiring switch portion is "ON" and the first wiring switch portion is "OFF", the current is fed from the power supply to the second wiring and thus the second driving element portion 150g is heated. When the second driving element portion 150g is heated, its length is shortened and thus the driving magnet 130 is moved toward the second direction. The length of the first driving element portion 150f is determined so that the first driving element portion 150f is not tightened when the length of the second driving element portion 150g is shortened under the circumstances. Then if the second wiring switch portion is turned "OFF", the feeding of current from the power supply portion to the second wiring is shut off and thus the temperature of the second driving element portion 150g is returned to the ordinary temperature. When the temperature of the second driving element portion 150g is returned to the ordinary temperature, the length of the second driving element portion 150g is returned to its original length.

Figure 6:
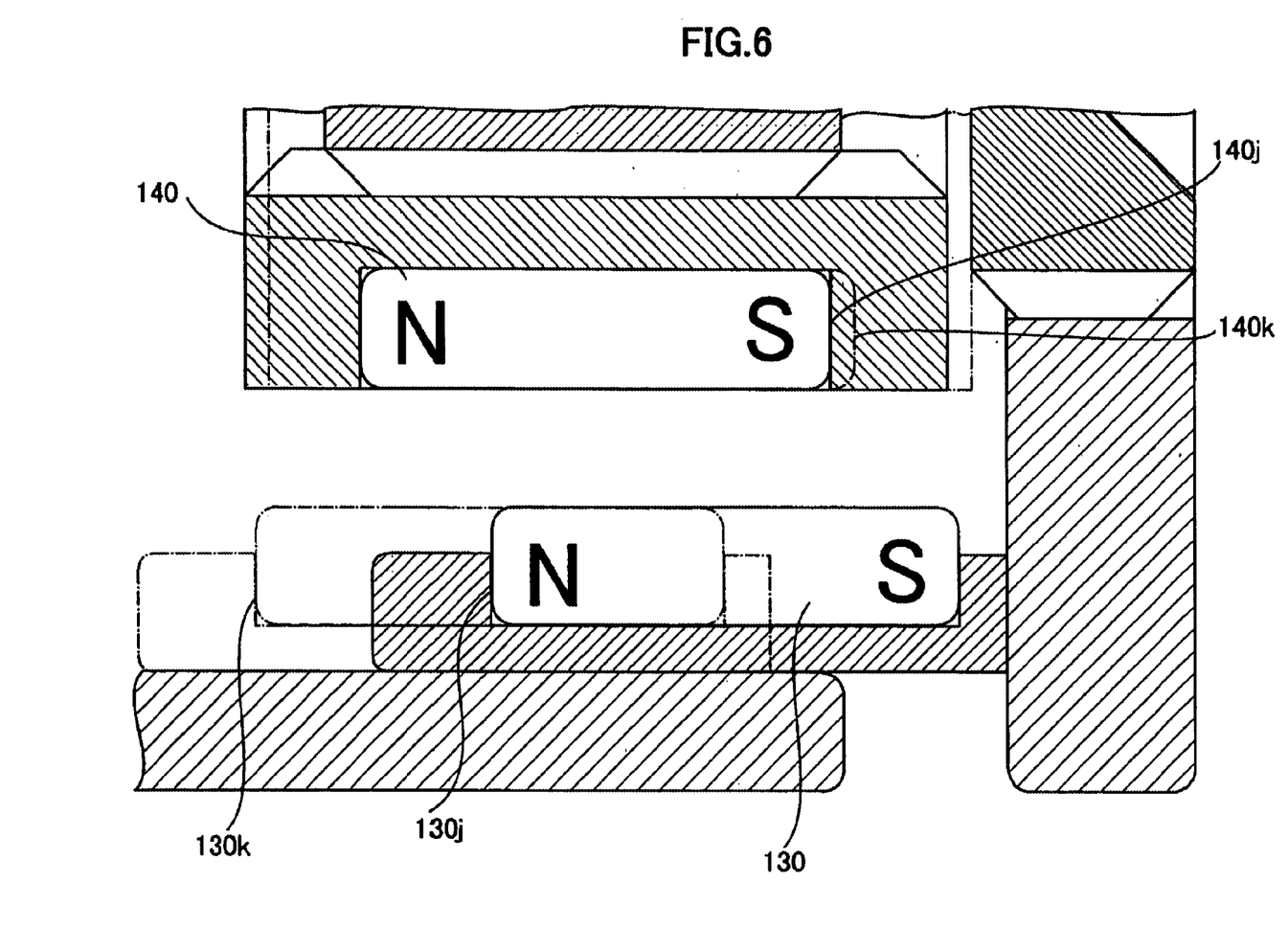
FIG. 6 is a partially enlarged vertical cross-sectional view showing the operation of the magnets of an embodiment of a lens apparatus using the apparatus for holding a stable condition at two positions of the present invention.
Figure 7:
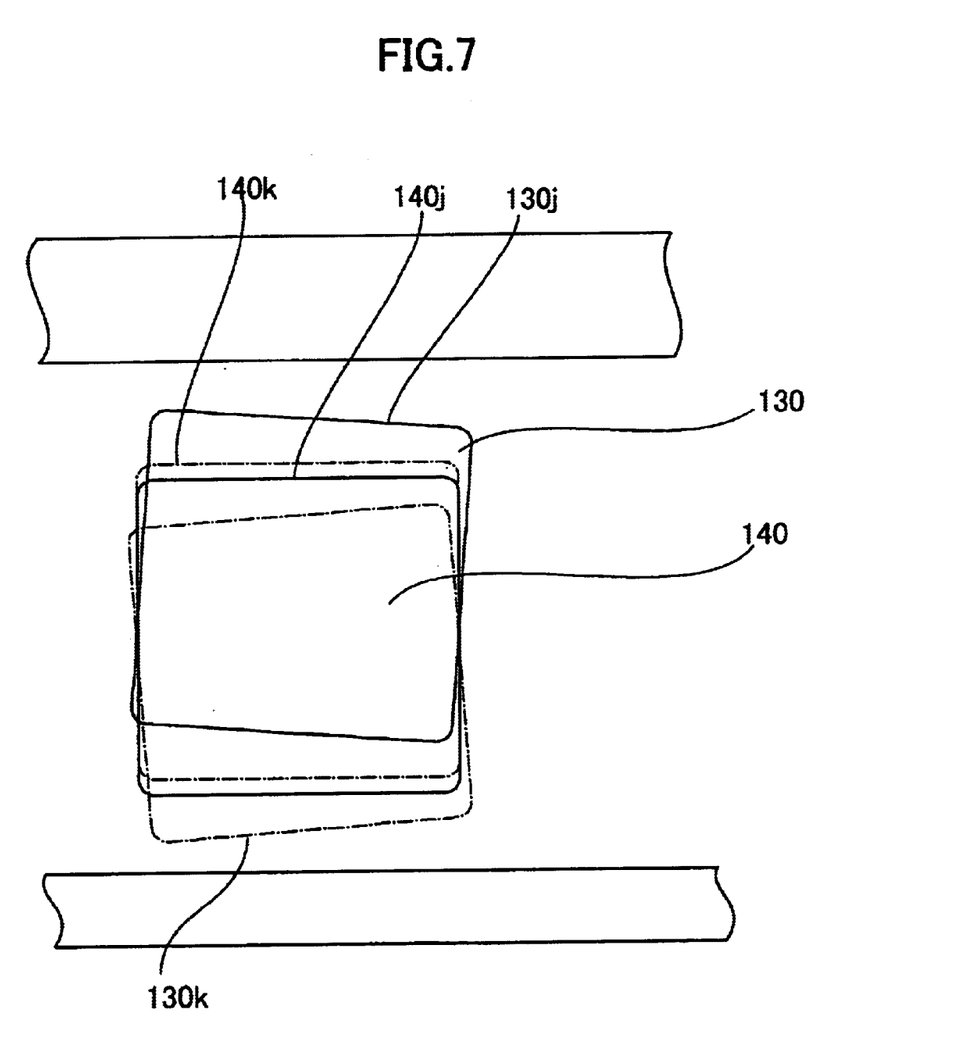
FIG. 7 is a partially enlarged bottom-plan view showing the operation of the magnets of an embodiment of a lens apparatus using the apparatus for holding a stable condition at two positions of the present invention.

As described above, the alloy wire 150 comprising the first driving element portion 150f and the second driving element portion 150g constitutes the actuator. Thus the actuator is formed as having the first driving element portion 150f for moving the driving magnet 130 toward the first direction and the second driving element portion 150g for moving the driving magnet 130 toward the second direction. With reference to FIGS. 6 and 7, in an initial condition in which both the first wiring switch portion and the second wiring switch portion are "OFF", the driving magnet 130 is positioned at the normal position 130j shown by a solid line and the follower magnet 140 is positioned at the normal position 140j shown by a solid line.

In a condition in which the first wiring switch portion is "ON" and the second wiring switch portion is "OFF", the current is fed from the power supply to the first wiring and thus the first driving element portion 150f is heated. When the first driving element portion 150f is heated, its length is shortened and thus the driving magnet 130 is moved toward the first direction and is positioned at the macro position 130k shown by a dot/dash line. If the driving magnet 130 is moved toward the first direction as well as the center line between the driving magnetic poles N and S of the driving magnet 130 passes over the center line between the follower magnetic poles N and S of the follower magnet 140, the follower magnetic poles are repulsed by the driving magnetic poles and thus the follower magnet 140 is moved toward the first direction and is positioned at the macro position 140k shown by a dot/dash line. Then when the first wiring switch portion is turned "OFF", the feeding of current from the power supply portion to the first wiring is shut off and thus the temperature of the first driving element portion 150f is returned to the ordinary temperature. When the temperature of the first driving element portion 150f is returned to the ordinary temperature, the length of the first driving element portion 150f is returned to its original length.

Then in a condition in which the second wiring switch portion is "ON" and the first wiring switch portion is "OFF", the current is fed from the power supply to the second wiring and thus the second driving element portion 150g is heated. When the second driving element portion 150g is heated, its length is shortened and thus the driving magnet 130 is moved toward the second direction and is positioned at the normal position 130j shown by a solid line. If the driving magnet 130 is moved toward the second direction as well as the center line between the driving magnetic poles N and S of the driving magnet 130 passes over the center line between the follower magnetic poles N and S of the follower magnet 140, the follower magnetic poles are repulsed by the driving magnetic poles and thus the follower magnet 140 is moved toward the second direction and is positioned at the normal position 140j shown by a solid line. Then when the second wiring switch portion is turned "OFF", the feeding of current from the power supply portion to the second wiring is shut off and thus the temperature of the second driving element portion 150g is returned to the ordinary temperature. When the temperature of the second driving element portion 150g is returned to the ordinary temperature, the length of the second driving element portion 150g is returned to its original length.

As can be seen from the description above, the lens apparatus of the present invention is constituted so that the follower magnet 140 is moved toward a direction different from the first direction, and thus the follower magnet 140 can be moved to a direction different from the second direction when the actuator is operated to move the driving magnet 130 toward the second direction.

When photographing an object using the lens apparatus of the present invention, if the object is positioned at a distance away from the lens apparatus for example more than 1 m, the image of the object is focused on the photographing element 122 through the lens system 110 by operating the actuator to set the moving lens 114 at the normal position. For example, when the object is positioned at a short distance away from the lens apparatus for example less than 1 m, the image of the object is focused on the photographing element 122 through the lens system 110 by operating the actuator to set the moving lens 114 at the macro position. According to this structure, it is possible to obtain an image of object always in focused on the photographing element 122 either the object is positioned near or away from the lens apparatus.

EXAMPLE

Figure 8:
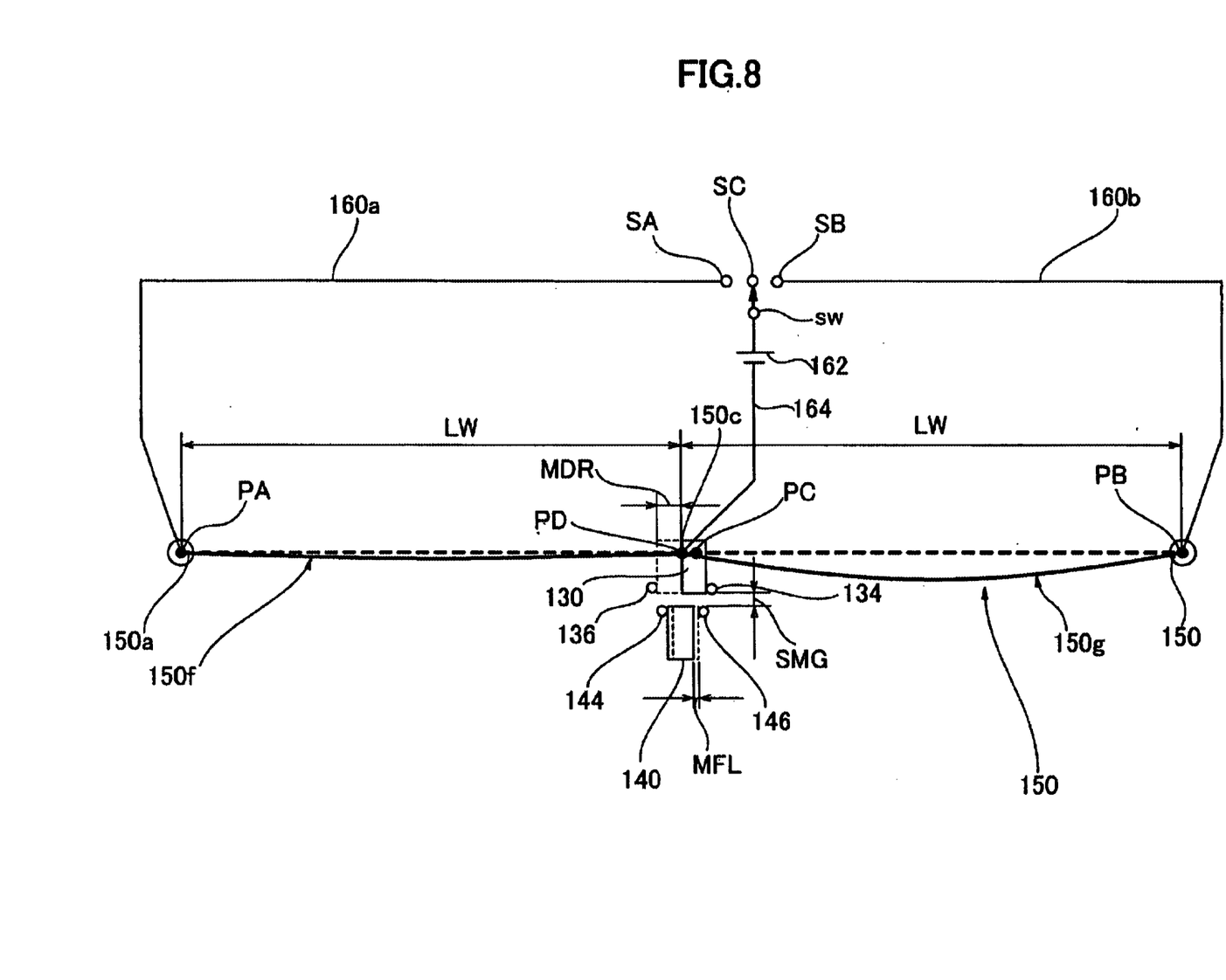
FIG. 8 is a developed plan view of a schematic structure of the mechanism for actuating the magnets of an embodiment of a lens apparatus using the apparatus for holding a stable condition at two positions of the present invention.

One example of the present invention will be described with reference to the accompanied drawings. As shown in FIG. 8, the actuator for rotating the driving magnet 130 in two directions comprises the driving element made of the alloy wire 150 formed by shape-memory alloy. The shape-memory alloy used is "Ni—Ti family shape-memory/superelasticity alloy" available for example from Furukawa Electric Industries, Japan under a name of "NT-H7-TTR wire"®. The diameter of the alloy wire 150 is 58 μm.

The one end 150a of the alloy wire 150 is connected to a first securing point PA of the supporting member. The other end 150b of the alloy wire 150 is connected to a second securing point PB of the supporting member. The middle portion 150c in length of the alloy wire 150 is secured to a point PC near the end of the driving magnet holder 132. A portion between the end 150a and the middle point 150c of the alloy wire 150 forms the first driving element portion 150f for moving the driving magnet 130 toward the first direction. A portion between the end 150b and the middle point 150c of the alloy wire 150 forms the second driving element portion 150g for moving the driving magnet 130 toward the second direction opposite to the first direction. It is defined that a point between the points PA and PB as a mechanical center PD. That is, the distance between points PA and PD and the distance between points PB and PD are LW.

The material of the driving magnet 130 and the follower magnet 140 is samarium cobalt. The thickness of the driving magnet 130 and the follower magnet 140 is 1.0 mm. The gap between the driving magnet 130 and the follower magnet 140 is 0.5 mm. The first wiring 160a for feeding current to the first driving element portion 150f is connected to the end 150a of the alloy wire 150 and a first switch terminal SA. The second wiring 160b for feeding current to the second driving element portion 150g is connected to the other end 150b of the alloy wire 150 and a second switch terminal SB. A battery 162 for selectively feeding current to the first wiring 160a or the second wiring 160b is arranged on a battery wiring 164 between the middle portion 150c in length of the alloy wire 150 and a switch input terminal SW. In the illustrated embodiment, the electric resistance of the alloy wire 150 is about 10 Ω, and the voltage of the battery is 1.5 V. A neutral switch terminal SC is arranged for keeping a neutral position not to operate the actuator. That is, the switch terminal SW is connected to the neutral switch terminal SC while the actuator is not in the operated condition as shown in FIG. 8.

The lengths of the first and second driving element portions 150f and 150g are set as having (L+dL) at the ordinary temperature. The length dL is set so that no tension is applied to one of the first and second driving element portions 150f and 150g when the other of the first and second driving element portions 150f and 150g is energized. In the illustrated embodiment, the length L is 20 mm and the length dL is 0.1 mm. That is, the initial length of the first driving element portion 150f is 20.1 mm and the initial length of the second driving element portion 150g is 20.1 mm. In addition, the initial length of the first driving element portion 150f and the initial length of the second driving element portion 150g are set so that no tension is applied to one of the first and second driving element portions 150f and 150g when the other of the first and second driving element portions 150f and 150g is energized and heated. In FIG. 8, the initial conditions of the first driving element portion 150f and the second driving element portion 150g are shown by solid lines and the conditions in which the first driving element portion 150f is fed with a current of 150 mA are shown by dotted lines. The time duration of energizing the driving element portion is 0.5 second. The amount of movement MDR of the driving magnet 130 movable between its normal position limiting portion 134 and its macro position limiting portion 136 is 1 mm. The amount of movement MFL of the follower magnet 140 movable between its normal position limiting portion 144 and its macro position limiting portion 146 is 0.2 mm. That is, the movable amount of movement MDR of the driving magnet 130 is larger than that MFL of the follower magnet 140.

Figure 9:
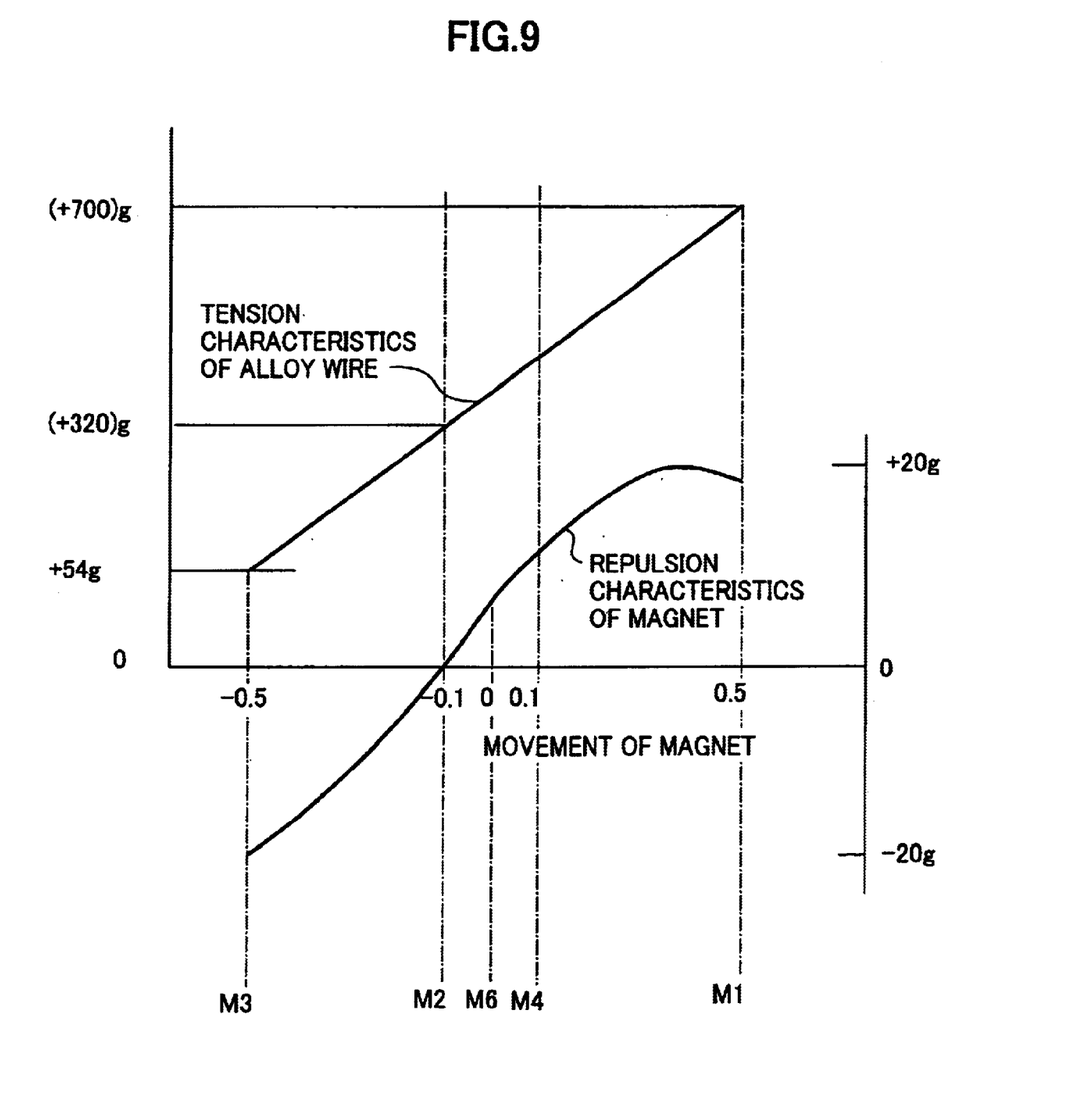
FIG. 9 is a graph showing a relation between the repulsion force of magnets and the tension of alloy wire.

In FIG. 9, the abscissa denotes the amount of movement of the driving magnet 130, and the ordinate denotes the tension characteristics of the driving element portion (an upper graph in FIG. 9) and the repulsion characteristics between the driving magnet 130 and the follower magnet 140 (a lower graph in FIG. 9). On the abscissa, "M1" denotes a position in which the driving magnet 130 contacts its normal position limiting portion 134, "m2" denotes a position in which the follower magnet 140 contacts its normal position limiting portion 144, "M3" denotes a position in which the driving magnet 130 contacts its macro position limiting portion 136, "M4" denotes a position in which the follower magnet 140 contacts its macro position limiting portion 146, and "M6" denotes a position of the mechanical center PD. On the abscissa showing the amount of movement of the driving magnet 130, "M6" is an original point and the right hand side is positive.

With reference to FIGS. 8 and 9, when the switch input terminal SW is connected to the first switch terminal SA through a switching operation, a current is fed from the battery 162 to the first wiring 160a and thus the first driving element portion 150f is heated. Due to the heating of the first driving element portion 150f, its length is reduced and thus a contracting force of 700 gram (toward the left hand side in FIG. 8) is generated in the first driving element portion 150f at "M1" in FIG. 9. Due to this contracting force, the driving magnet 130 moves toward the left hand side (FIG. 8). Due to this movement of the driving magnet 130, a contracting force of 320 gram (toward the left hand side in FIG. 8) is generated in the first driving element portion 150f at "M2". In addition, the driving magnet 130 moves toward the left hand side in FIG. 8 and generates a contracting force of 54 gram (toward the left hand side in FIG. 8) in the first driving element portion 150f at "M3". The driving magnet 130 moves 1 mm toward the left hand side from "M1" to "M3" in FIG. 8. When the driving magnet 130 moves 1 mm toward the left hand side from "M1" to "M3" in FIG. 8, the follower magnet 140 moves 0.2 mm toward right hand side from "M2" to "M4".

It is indicated at "M1" that the repulsion force between the driving magnet 130 and the follower magnet 140 is slightly less than 20 gram. When the driving magnet 130 moves, the repulsion force between the driving magnet 130 and the follower magnet 140 decreases and exhibits 0 gram at "M2". When the driving magnet 130 continues to further move, the direction of the repulsion force between the driving magnet 130 and the follower magnet 140 changes. That is, the driving magnet 130 applies a force toward the left hand side in FIG. 8 to the follower magnet 140 at a region between "M1" and "M2" and on the contrary applies a force toward the right hand side in FIG. 8 to the follower magnet 140 at a region between "M2" and "M3". The repulsion force between the driving magnet 130 and the follower magnet 140 exhibits about 20 gram at "M3".

It is required in this design that a tension of the first driving element portion 150f is less than 100 g at "M3", more than 0 gram at "M2", and more than 20 gram at "M1". In this design, as described above, L is 20 mm, and dL is 0.1 mm. It is practical that the value of dL is 0.05 mm~0.45 mm.

Then, when the switch input terminal SW is turned to the neutral switch terminal SC, the feeding of current from the battery 162 to the first wiring 160a is shut off and the temperature of the first driving element portion 150f is returned to the ordinary temperature. When the first driving element portion 150f is returned to the ordinary temperature, the length of which is returned to its original length. When the switch input terminal SW is connected to the first switch terminal SB, a current is fed from the battery 162 to the second wiring 160b and thus the second driving element portion 150g is heated. Due to the heating of the second driving element portion 150g, its length is shortened and the driving magnet 130 is moved toward right hand side in FIG. 8. Then when the switch input terminal SW is turned to the neutral switch terminal SC, the feeding of current from the battery 162 to the second wiring 160b is shut off and the temperature of the second driving element portion 150g is returned to the ordinary temperature and thus the length of which is returned to its original length.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. An apparatus for holding a stable condition at two positions comprising:
    a driving magnet having driving magnetic poles and adapted to be movable in two directions;
    a driven magnet having driven magnetic poles arranged to be always repulsed by the driving magnetic poles and adapted to be movable in two directions;
    a motion limiting means for limiting the movement of the driven magnet; and
    a driving means for driving the driving magnet in two directions;
    wherein a direction of the repulsion force applied to the driven magnet by the driving magnet is changed, at a stage during which the driving magnet is moved to a first moving direction by the driving means, to a second acting direction of repulsion force opposite to a first acting direction of repulsion force which has been caused until said stage;
    and wherein a direction of the repulsion force applied to the driven magnet by the driving magnet is changed, at a stage during which the driving magnet is moved to the second moving direction opposite to the first moving direction by the driving means, to the first acting direction of repulsion force opposite to the second acting direction of repulsion force which has been caused until said stage.

2. An apparatus for holding a stable condition at two positions of claim 1 wherein the driving means is made of shape-memory alloy and includes a driving element for driving the driving magnet.

3. An apparatus for holding a stable condition at two positions of claim 1 wherein an amount of movement of the driving magnet is larger than that of the driven magnet.

4. An apparatus for holding a stable condition at two positions of claim 1 wherein the driving magnet and the driven magnet are moved in parallel with each other.

5. An apparatus for holding a stable condition at two positions of claim 1 wherein at least one of the driving magnet and the driven magnet are moved in rotation.

6. An apparatus for holding a stable condition at two positions of claim 1 wherein the driving means comprises a first driving element made of shape-memory alloy for driving the driving magnet toward the first moving direction, and a second driving element made of shape-memory alloy for driving the driving magnet toward the second moving direction.

7. An apparatus for holding a stable condition at two positions of claim 1 wherein the driving means comprises a driving element made of shape-memory alloy, the driving element includes a first driving element portion for driving the driving magnet toward the first moving direction and a second driving element portion for driving the driving magnet toward the second moving direction, the driving means further comprises a first wiring for supplying a current to the first driving element portion, a second wiring for supplying a current to the second driving element portion, and a power supplying portion for selectively supplying the current to the first wiring or the second wiring.

8. A lens apparatus having a lens system including a moving lens comprises:
    a lens supporting member;
    an apparatus for holding a stable condition at two positions of claim 1 mounted on the lens supporting member; and
    the moving lens can be driven by the movement of a driven magnet of the apparatus for holding a stable condition at two positions.

* * * * *